US010291805B1

(12) United States Patent
Moro

(10) Patent No.: US 10,291,805 B1
(45) Date of Patent: May 14, 2019

(54) IMAGE PROCESSING APPARATUS

(71) Applicants: KABUSHIKI KAISHA TOSHIBA, Tokyo (JP); TOSHIBA TEC KABUSHIKI KAISHA, Tokyo (JP)

(72) Inventor: Akihiro Moro, Sunto Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/925,896

(22) Filed: Mar. 20, 2018

(51) Int. Cl.
*H04N 1/00* (2006.01)
*G06K 9/00* (2006.01)
*G06F 3/12* (2006.01)

(52) U.S. Cl.
CPC ....... *H04N 1/00827* (2013.01); *G06F 3/1206* (2013.01); *G06K 9/00456* (2013.01); *H04N 1/00551* (2013.01); *H04N 1/00785* (2013.01); *G06K 2209/501* (2013.01)

(58) Field of Classification Search
CPC ........... H04N 1/00827; H04N 1/00551; H04N 1/00785; G06F 3/1206; G06K 9/00456; G06K 2209/501
USPC ........................................................ 358/1.15
See application file for complete search history.

(56) References Cited

U.S. PATENT DOCUMENTS 5,267,326 A * 11/1993 Rao ........................ G06K 9/342 382/179
5,640,252 A * 6/1997 Turner ................... G03B 27/62 358/497
9,690,986 B1 * 6/2017 Walker .............. G06K 9/00442
2007/0076268 A1 4/2007 Shojo
2011/0192894 A1 * 8/2011 Ragnet .............. G06F 17/30563 235/375
2014/0268217 A1 * 9/2014 Kawata .............. H04N 1/00832 358/1.15
2016/0219163 A1 * 7/2016 Shirado .............. H04N 1/00257
2017/0244853 A1 * 8/2017 Yabuuchi ........... H04N 1/00827

FOREIGN PATENT DOCUMENTS

JP 2006-331222 12/2006

* cited by examiner

*Primary Examiner* — Allen H Nguyen
(74) *Attorney, Agent, or Firm* — Kim & Stewart LLP

(57) ABSTRACT

An image processing apparatus includes a document placing table, a scanner configured to read a reading region on the document placing table from below the document placing table, an interface configured to communicate with an image capturing device which is positioned above the document placing table to capture an image of a capturing region on the document placing table from above the document placing table, and a processor configured to generate an image file in which first image data obtained by reading a target placed on the document placing table with the scanner and second image data obtained from the image capturing device via the interface, are associated with each other, wherein the second image data is generated from at least one image of the target captured by the image capturing device from above the document placing table.

15 Claims, 14 Drawing Sheets

FIG. 9

| | | | | |
|---|---|---|---|---|
| FRONT SURFACE DATA | SCAN TARGET | SCAN DATA | DOCUMENT DETECTION POSITION | DETECTION SIZE |
| | FIRST SCAN FROM ABOVE | DATA F1 | (dx1,dy1) | X1,Y1 |
| | SECOND SCAN FROM ABOVE | DATA F2 | (dx2,dy2) | X2,Y2 |
| | THIRD SCAN FROM ABOVE | DATA F3 | (dx3,dy3) | X3,Y3 |
| | ⋮ | ⋮ | ⋮ | ⋮ |
| REAR SURFACE DATA | FIRST SCAN FROM BELOW | DATA B1 | (dx11,dy11) | X11,Y11 |
| | SECOND SCAN FROM BELOW | DATA B2 | (dx12,dy12) | X12Y12 |
| | THIRD SCAN FROM BELOW | DATA B3 | (dx13,dy13) | X13,Y13 |
| | ⋮ | ⋮ | ⋮ | ⋮ |
| OCR DATA | CONTENTS THAT DATA INDICATES | RECOGNITION RESULT OF OCR PROCESSING | | |
| | DOCUMENT NAME | Scan operation manual | | |
| | LIBRARY NAME | ABC library | | |
| | MANAGEMENT NUMBER | 123456 | | |

IMAGE PROCESSING APPARATUS

FIELD

Embodiments described herein relate generally to an image processing apparatus.

BACKGROUND

In a digital multi-functional machine of the related art, when reading a spread document, such as a book, it is necessary for a user to set a page to be read on a document table of a scanner with the page to be read facing downward. When reading several spread documents consecutively, it is necessary for the user to repeat an operation of instructing the scanning after turning over the page of the book document and replacing the book downward on the document table. In addition, in the related art, there is also a book scanner in which a book document placed at a predetermined position in a state where the page to be read faces upward is read by a camera from above. However, even in such a digital multi-functional machine or the book scanner, the user must set the book document when reading a cover of the document and each page of the document each time. In addition, it is necessary for the user to manually set information that specifies the image data obtained by the scanning in this manner.

DESCRIPTION OF THE DRAWINGS

FIG. 9 is a view illustrating an example of an information management table created by the image processing apparatus according to the embodiment in reading using the scanner and the camera of the portable terminal.

DETAILED DESCRIPTION

Embodiments provide an image processing apparatus which can easily generate a file in which an image obtained by reading a reading target from below and an image read from above are associated with each other without a manual operation.

According to an embodiment, an image processing apparatus includes a document placing table, a scanner configured to read a reading region on the document placing table from below the document placing table, an interface configured to communicate with an image capturing device which is positioned above the document placing table to capture an image of a capturing region on the document placing table from above the document placing table, and a processor configured to generate an image file in which first image data obtained by reading a target placed on the document placing table with the scanner and second image data obtained from the image capturing device via the interface, are associated with each other, wherein the second image data is generated from at least one image of the target captured by the image capturing device from above the document placing table.

Hereinafter, embodiments will be described with reference to the drawings.

Figure 1:
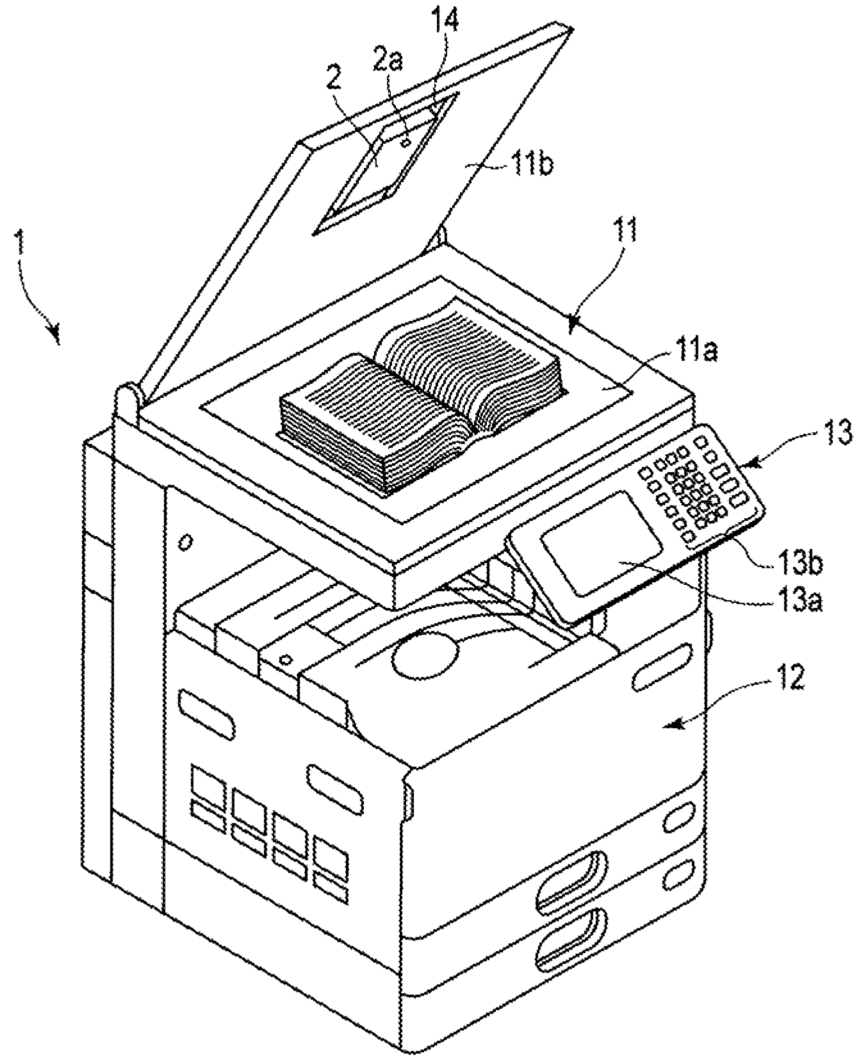
FIG. 1 is a view schematically illustrating an example of an image processing apparatus according to an embodiment.

FIG. 1 is a view schematically illustrating an image processing system according to an embodiment.

The image processing system illustrated in FIG. 1 includes a digital multi-functional machine (which is an example of an image processing apparatus) 1 and a portable terminal (which is an example of a capturing device) 2. The digital multi-functional machine (also known as MFP, Multi-Functional Peripheral) 1 is an image processing apparatus including a scanner 11 that serves as an image reading device. The digital multi-functional machine 1 includes a printer 12 that serves as an image forming device, an operation panel 13, and the like.

The portable terminal 2 includes a camera 2*a* and is an image capturing device having a communication function with the digital multi-functional machine 1. In the embodiment, the portable terminal 2 is a portable electronic device (e.g., a digital camera, a smartphone, a portable phone, a tablet PC, and the like) which is attachable to and detachable from the digital multi-functional machine 1 possessed by a user. However, the portable terminal 2 may be a device that can capture an image from above a document table 11*a*, and may be an image capturing device which is standard equipment of the digital multi-functional machine 1.

First, the details of the digital multi-functional machine 1 will be described.

As illustrated in FIG. 1, the digital multi-functional machine 1 includes the scanner 11, the printer 12, and the operation panel 13. Furthermore, the digital multi-functional machine 1 includes a system processing unit 15 which is not illustrated in FIG. 1, an image processing unit 16, an external I/F 17 (refer to FIG. 3), and the like. The system processing unit 15 is connected to the scanner 11, the printer 12, and the operation panel 13, and performs control of each unit, data processing, and the like.

The scanner 11 is installed on an upper part of a main body of the digital multi-functional machine 1. The scanner 11 is an image reading device which optically reads an image of a document and converts the image into image data. The scanner 11 includes the document table (which is an example of a placing table) 11*a* and a document table cover 11*b*. The document table 11*a* is made of a transparent member, such as glass. The scanner 11 reads the document placed on the document table 11*a* from below the document table 11*a*.

For example, the scanner 11 is a flatbed type image reading device including a carriage for optically scanning the document from below the document table 11*a*. In addition, the document table cover 11*b* is installed to be freely openable and closable. The document table cover 11*b* covers a reading region where the document is placed in the document table 11*a* in a closed state. The document table cover 11*b* includes a mechanism which is stationary in an open state. For example, the document table cover 11*b* includes a mechanism which is stationary in a state where an angle formed by a document placing surface in the document table 11*a* is a predetermined angle, and a mechanism which is stationary in a full open state where the angle formed by the document placing surface is open by approximately 90°.

The printer 12 prints the image on a paper sheet that is an image forming medium. For example, the printer 12 prints the image read by the scanner 11 or an image captured by the camera 2*a* of the portable terminal 2 on the paper sheet. In addition, the printer 12 may print the image on a paper sheet based on image data received via a network or the like. An image forming method of the printer 12 is not limited to a particular method. For example, the printer 12 may be an electrophotographic printer, an ink jet type printer, or a thermal transfer type printer.

The operation panel 13 is a user interface. The operation panel 13 includes a display unit 13*a* and an operation unit 13*b*. The display unit 13*a* displays guide and the like. The operation unit 13*b* includes an operation button or a touch panel for receiving an input to a button (e.g., icon) displayed on the display unit 13*a*. The user instructs the start of scanning on the operation panel 13 and confirms the result of the scanning. For example, reading of a book document in which the digital multi-functional machine 1 and the portable terminal 2 are linked is executed in response to an operation instruction on the operation panel 13.

In addition, the digital multi-functional machine 1 includes a holding unit 14 for holding the portable terminal 2 above the document table 11*a*. In the example illustrated in FIG. 1, the holding unit 14 is installed on the document table cover 11*b* as a recess in which the camera 2*a* is accommodated. In addition, the holding unit 14 is provided at a position where the camera 2*a* of the portable terminal 2 can capture an upper surface of the book document placed on the reading region of the document table 11*a*, in the document table cover 11*b*. The holding unit 14 includes a mechanism (e.g., a pair of movable tabs) for holding the portable terminal 2 in place within the recess. The holding unit 14 has a cover attached thereto instead of the portable terminal 2 when the portable terminal 2 is not used. When attaching the portable terminal 2, the cover is removed from the holding unit 14 and the portable terminal 2 is held by the holding mechanism of the holding unit 14.

In addition, the holding unit 14 holds the portable terminal 2 in a state where the camera 2*a* faces the document table 11*a* and the document table cover 11*b* is open at a predetermined angle. The holding unit 14 may be a unit that can hold the portable terminal 2 such that a capturing range of the camera 2*a* includes the entire reading region on the document table 11*a*. For example, the holding unit 14 is configured such that the camera 2*a* of the portable terminal 2 to be fixed can capture the entire surface of the document table 11*a* in a state where the document table cover 11*b* is stationary at a predetermined angle. In addition, the holding unit 14 may include a sensor for detecting that the portable terminal 2 is set thereon.

Figure 2:
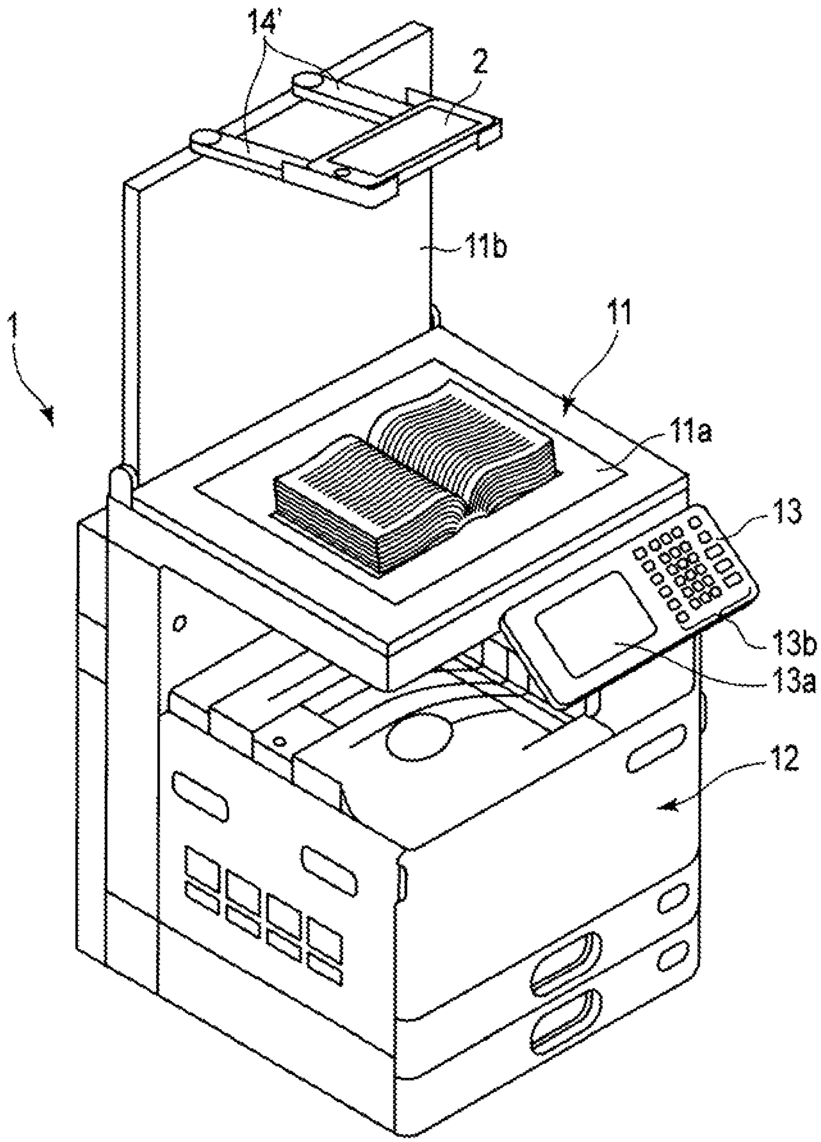
FIG. 2 is a view schematically illustrating another example of the image processing apparatus according to the embodiment.

In addition, FIG. 2 is a view illustrating another example of the holding unit provided in the digital multi-functional machine 1.

FIG. 2 illustrates an example in which the holding unit 14 in FIG. 1 is replaced with a holding unit 14'. Therefore, a detailed description except the holding unit 14' illustrated in FIG. 2 will be omitted.

The holding unit 14' illustrated in FIG. 2 includes a pair of supports for supporting the portable terminal 2. The holding unit 14' is provided in a side end portion on a near side of the document table cover 11*b*. The holding unit 14' has a first support and a second support which nip the portable terminal 2. The first support and the second support hold the portable terminal 2 such that the camera 2*a* faces the document table 11*a* in the side end portion of the document table cover 11*b* in an open state.

For example, in the holding unit 14' illustrated in FIG. 2, in a state where the document table cover 11*b* is fully open, the portable terminal 2 is placed such that the camera 2*a* faces downward. Accordingly, the camera 2*a* of the portable terminal 2 held by the holding unit 14' is substantially parallel to the surface on which the document of the document table 11*a* is placed. In addition, in the first support and the second support which make up the holding unit 14', installation units may be respectively installed to be rotatable around the rotation center in the side end portion of the document table cover 11*b*. Accordingly, each of the supports that serve as the holding unit 14' may be folded and stored so as not to obstruct the opening and closing of the document table cover 11*b* when the portable terminal 2 is not used.

The digital multi-functional machine 1 including the holding unit 14 illustrated in FIG. 1 is described in the following.

Next, the control system of the digital multi-functional machine 1 will be described.

Figure 3:
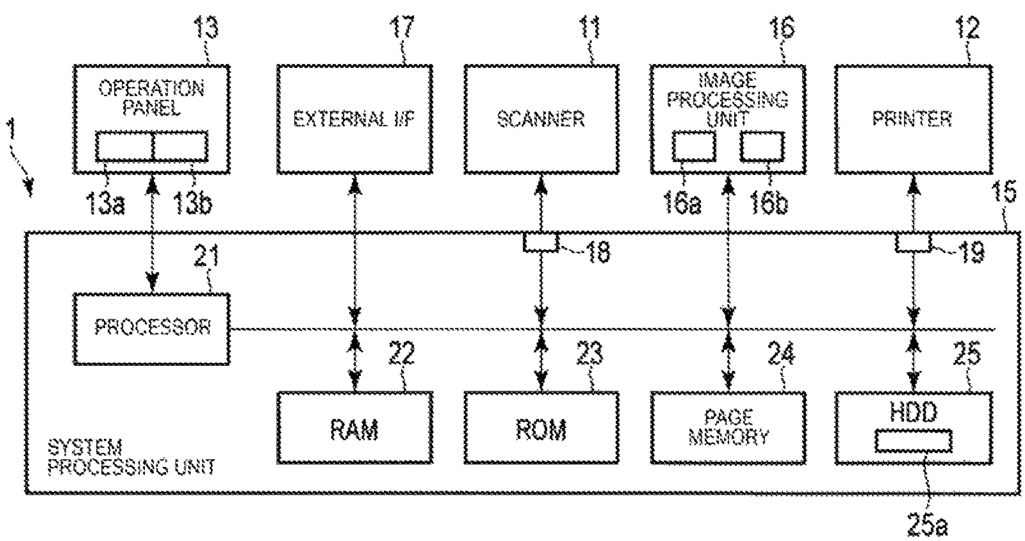
FIG. 3 is a block diagram illustrating a control system in the image processing apparatus according to the embodiment.

FIG. 3 is a block diagram for explaining an example of the control system in the digital multi-functional machine 1.

The digital multi-functional machine 1 includes the system processing unit 15 for controlling the entire apparatus. The system processing unit 15 is connected to the scanner 11, the printer 12, the operation panel 13, the image processing unit 16, and the external interface (I/F) 17. In addition, the scanner 11 is connected to the system processing unit 15 via a scanner interface 18. The printer 12 is connected to the system processing unit 15 via a printer interface 19.

In addition, in the example illustrated in FIG. 3, the system processing unit 15 includes a processor 21, a RAM 22, a ROM 23, a page memory 24, an HDD 25, and the like.

The processor 21 performs control of each unit, data processing, and the like. The processor 21 is, for example, a CPU. The processor 21 is connected to each unit in the system processing unit 15 via a system bus. In addition, the processor 21 is also connected to the scanner 11, the printer 12, the operation panel 13, the image processing unit 16, the external I/F 17 and the like, via the system bus.

For example, the processor 21 outputs operation instructions to each of the units by bidirectional communication with the scanner 11, the printer 12, the operation panel 13, the image processing unit 16, and the external I/F 17, or obtains various types of information from each of the units. In the embodiment, the processor 21 obtains a rear surface image scanned by the scanner 11 via the scan interface. In addition, the processor 21 obtains a front surface image captured by the camera 2*a* from the portable terminal 2 via the external interface.

The RAM 22 functions as a working memory or a buffer memory. The ROM 23 is a non-rewritable, nonvolatile memory for storing programs, control data, and the like. The processor 21 realizes various types of processing by executing a program stored in the ROM 23 or the HDD 25 while using the RAM 22. For example, by executing the program, the processor 21 performs processing, such as image cutting-out, skew correction, document size detection, OCR, file conversion, data transfer, and the like.

The page memory 24 is a memory for storing the image data which is a target of the processing. For example, the page memory 24 stores image data read by the scanner 11 or image data obtained from the portable terminal 2 via the external I/F 17. In addition, the page memory 24 also stores the image data and the like during image processing.

The hard disk drive (HDD) 25 is a rewritable, nonvolatile memory. The HDD 25 is an example of a storage device. Another example of the storage device is an SSD. The HDD 25 stores control programs and control data executed by the processor 21. In addition, the HDD 25 includes an information management table 25*a* for managing information obtained by scanning a book document which will be described later. The information management table 25*a* will be described in detail later.

The image processing unit 16 includes an input processing unit 16*a* and an image quality improvement unit 16*b*. The input processing unit 16*a* processes the input image data. For example, the input processing unit 16*a* performs resolution conversion, brightness adjustment, contrast adjustment, saturation adjustment, sharpness adjustment, and the like, with respect to the input image data. The image quality improvement unit 16*b* performs a process of improving the image quality of the image data. In addition, the image processing unit 16 has a function of converting the image data into image data for printing (for example, image data of YMCK). Further, the image processing unit 16 may have a compression processing function of compressing the image data and an expansion processing function of expanding the compressed image data.

The external I/F 17 includes an interface for communicating with the image capturing device. In the embodiment, the external I/F 17 includes an interface for communicating with the portable terminal 2 attached to the holding unit 14 or 14'. The external I/F 17 for communicating with the portable terminal 2 may be an interface that corresponds to the communication function of the portable terminal 2. For example, the external I/F 17 is an interface that performs wireless communication, such as wireless LAN or short range wireless communication that serves as a wireless communication function of the portable terminal 2. In addition, the external I/F 17 may come into contact with the interface of the portable terminal 2 to communicate therewith.

In addition, the external I/F 17 may include a plurality of interfaces. In other words, the external I/F 17 may include an interface other than the interface for communication with the portable terminal 2. For example, the external I/F 17 may include an interface for network communication, such as a LAN, separately from the interface for communication with the portable terminal 2. Further, the external I/F 17 may include an interface for serial communication with a device, such as an external memory device.

In addition, the system processing unit 15 functions as a control unit of the scanner 11, and the scanner 11 and the system processing unit 15 may make up the image reading device. Further, a processor provided in the scanner 11 may have a corresponding function to the processor 21 of the system processing unit 15 which will be described later. In other words, the processing of the embodiment which will be described later may be realized by an image reading device which includes a stand-alone scanner and no printer.

Next, image processing focusing on the image processing unit 16 and the system processing unit 15 in the digital multi-functional machine 1 will be described.

Figure 4:
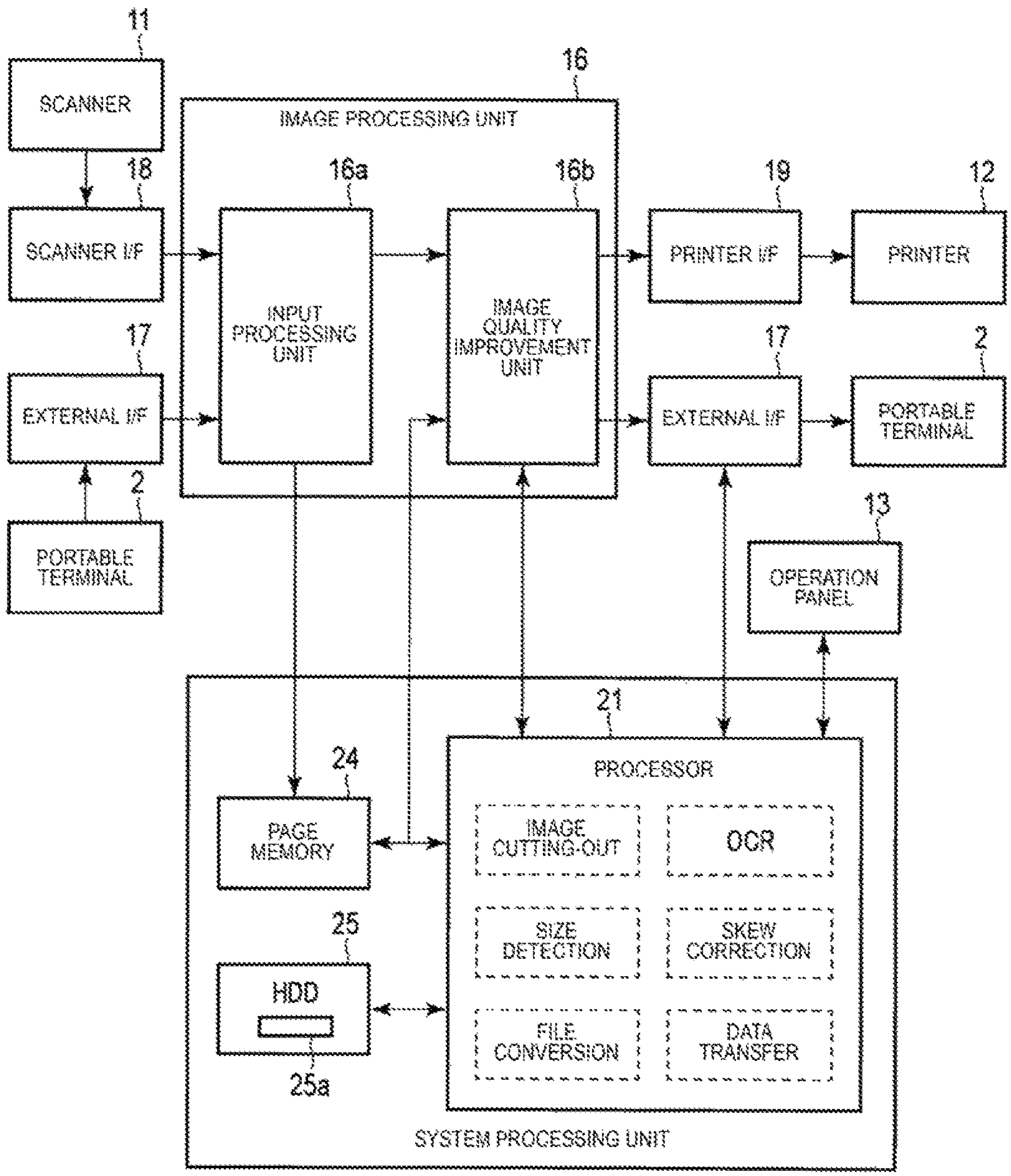
FIG. 4 is a view for explaining image processing in the image processing apparatus according to the embodiment.

FIG. 4 is a block diagram illustrating a flow of each processing block and image data in the digital multi-functional machine 1.

As illustrated in FIG. 4, image data is input from the scanner 11 or the external I/F 17 in the digital multi-functional machine 1. For example, the image read by the scanner 11 from below the document table 11*a* is supplied to the image processing unit 16. In addition, the portable terminal 2 installed in the holding unit 14 communicates with the processor 21 of the system processing unit 15 via the external I/F 17. The processor 21 supplies a control signal to the portable terminal 2, and accordingly, the camera 2*a* captures the image from above the document table 11*a*. The portable terminal 2 transmits the image captured by the camera 2*a* to the external I/F 17. The image captured by the camera 2*a* of the portable terminal 2 input via the external I/F 17 is supplied to the image processing unit 16 as an input image.

The input processing unit 16*a* of the image processing unit 16 performs image processing for the input image with respect to the image data input from the scanner 11 or the external I/F 17. For example, the input processing unit 16*a* includes a LUT processing unit and performs processing for correcting tone reproduction in the input image data. The LUT processing unit converts correction of scanner gradation reproduction skipping a highlight side by LUT data set by the processor 21 with respect to input image data.

The image quality improvement unit 16*b* of the image processing unit 16 performs the image quality improvement on the image data from the input processing unit 16*a* or the page memory 24. For example, the image quality improvement unit 16*b* has a function of performing filter processing, scaling processing, density adjustment processing, gradation processing, and the like, with respect to image data. The image quality improvement unit 16*b* executes image quality improvement with respect to the image data in accordance with the control from the processor 21.

The processor 21 of the system processing unit 15 controls each unit and executes various types of image processing. In the example illustrated in FIG. 4, the processor 21 performs image processing, such as image cutting-out, skew correction, size detection, OCR, file conversion, data transfer, and the like. For example, the processor 21 executes various types of processing in response to a user operation on the operation panel 13.

The image cutting-out is processing of cutting out an image data region surrounded by edges based on the image data stored in the page memory 24. In the skew correction, an inclination of the document in the image data cut out by the image cutting-out is corrected. In the skew correction, the processor 21 analyzes an inclined state of the document region in the image data, and corrects the inclination when there is an inclination. The processor 21 temporarily stores the image data after the skew correction in the page memory 24.

The size detection is processing for specifying the size of the document region in the image data. For example, the processor 21 specifies the document size based on the image data after the skew correction stored in the page memory 24.

The OCR processing is processing for recognizing letters in image data. For example, the processor 21 specifies the target region of the OCR processing in the image data stored in the page memory 24, and recognizes the letters in the target region. The target region of the OCR processing may be a predetermined region in the document region, or may be designated by the user through the operation panel 13.

File conversion is processing for generating a file including an image. In a case of executing the reading of the book document, the processor 21 generates an image file including an image of a cover of the book document to be read by the scanner 11 (hereinafter, referred to as a cover image) and an image of an internal page of the book document captured by the camera 2*a* (hereinafter, referred to as a page image). The processor 21 generates an image file related to the reading of one book document by using the cover image, the page image, the processing result of OCR, and the like.

For example, the processor 21 stores each piece of information related to the reading of the book document in the information management table 25*a*. Based on the information in the information management table 25*a*, the processor 21 performs merging the cover image and the page image, and generates a file in a predetermined format. In addition, the processor 21 stores the generated file in the HDD 25 as an image file to which a file name including information, such as a book name obtained by the OCR processing, is given.

The data transfer is processing of transferring the generated image file. For example, the processor 21 transfers the image file generated based on designation and the like of the user by the external I/F 17 to portable terminal 2. In addition, the processor 21 may store the image file in response to the designation of the user by the external I/F 17 in an external device different from the portable terminal 2.

Next, the reading of the book document using the portable terminal 2 and the digital multi-functional machine 1 will be described.

In the embodiment, an application program (hereinafter, referred to as an application) for reading the book document is installed in the portable terminal 2. The application for reading the book document is stored in the nonvolatile memory in the portable terminal 2 and executed by the processor in the portable terminal 2. The processor of the portable terminal 2 realizes functions, such as communication with the digital multi-functional machine 1, image capturing with the camera 2*a* in accordance with control from the digital multi-functional machine 1, transfer of the captured image to the digital multi-functional machine 1, by executing the application.

The user sets the portable terminal 2 in the holding unit 14 of the digital multi-functional machine 1 and selects a book document scanning mode with the operation unit 13*b*. When the book document scanning mode is selected, the digital multi-functional machine 1 communicates with the portable terminal 2 set in the holding unit 14. In response to the scan instruction, the digital multi-functional machine 1 executes image reading with the scanner 11 and image capturing with the camera 2*a* of the portable terminal 2.

Here, the book document is placed on the document table 11*a* in a state of being open such that the page to be read is facing upward. In other words, the book document is placed such that the cover is in contact with the document table 11*a*. Therefore, the scanner 11 reads an image including the image of the cover of the book document placed on the document table 11*a*.

Figure 5:
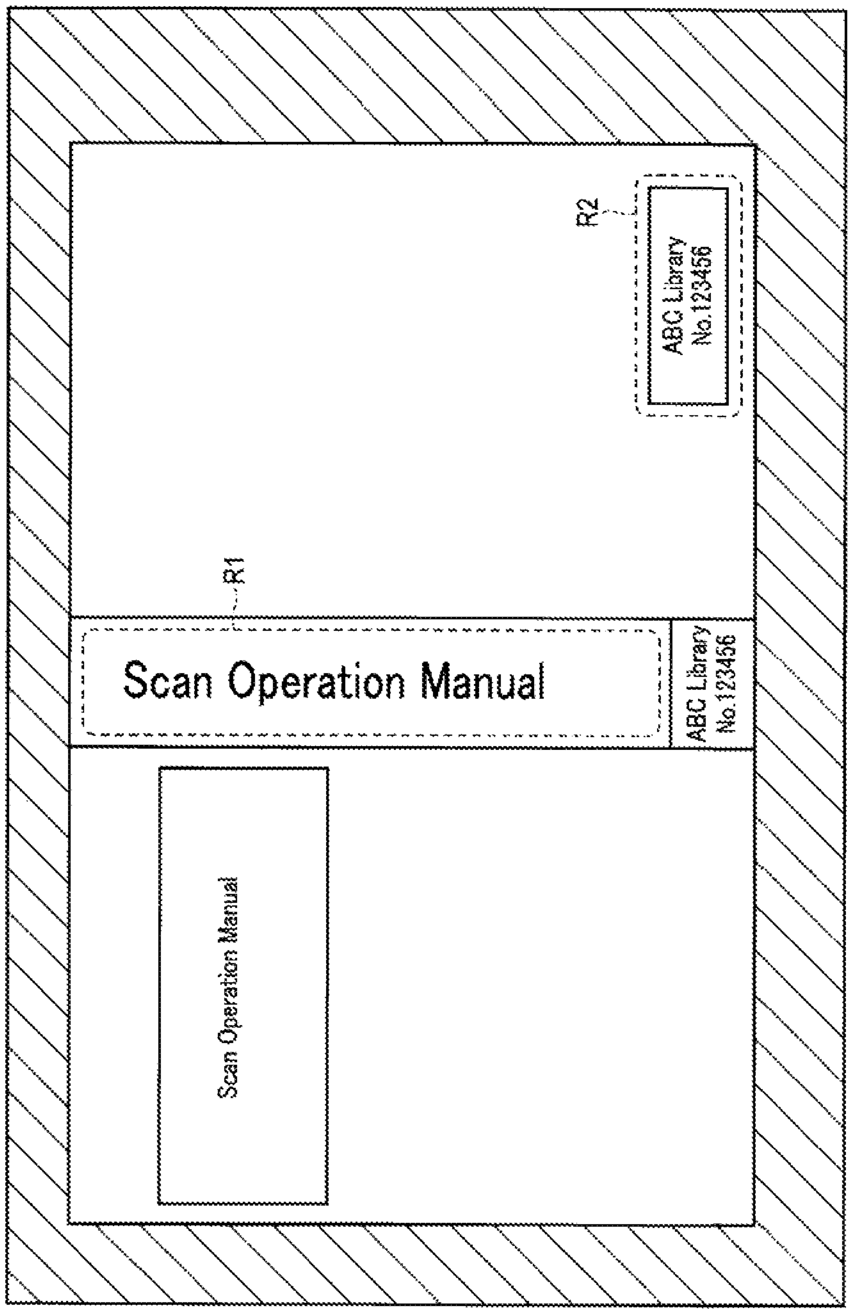
FIG. 5 is a view illustrating an example of a scanned image to be read by an image reading device according to the embodiment.

FIG. 5 is a view illustrating an example of an image to be read by the scanner 11 in the reading of the book document.

The scanner 11 reads the image of the reading region in the document table 11*a* from below the document table 11*a*. In a state where the book document is placed on the document table 11*a*, the scanner 11 reads an image including the image of the cover of the book document. In addition, in the embodiment, the scanner 11 reads an image in a state where the document table cover 11*b* is open. Therefore, as illustrated in FIG. 5, a scanned image to be read by the scanner 11 has the maximum density (e.g., black) in a region where the document does not exist.

In a state where the portable terminal 2 is held by the holding unit 14, the camera 2*a* captures an image including a front surface of the book document which is open upward, on the document table 11*a* from above the document table 11*a*. The portable terminal 2 is remotely controlled in response to the digital multi-functional machine 1. The portable terminal 2 captures the image of each page with the camera 2*a* in response to the instruction from the digital multi-functional machine 1. In addition, the portable terminal 2 transmits the image captured by the camera 2*a* to the digital multi-functional machine 1.

Figure 6:
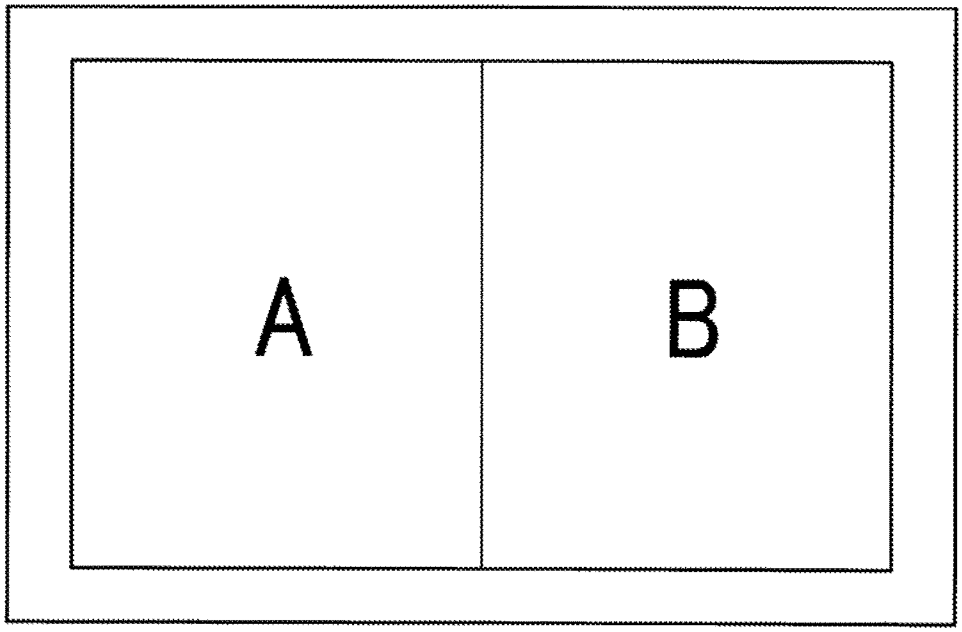
FIGS. 6-7 are each a view illustrating an example of an image captured by a camera of a portable terminal according to the embodiment.
Figure 7:
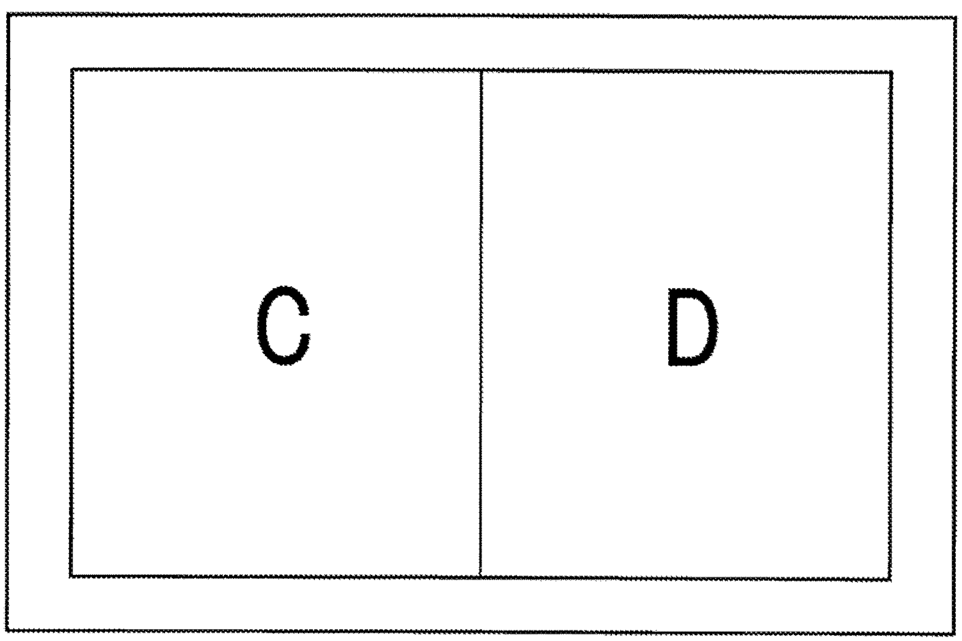

FIGS. 6 and 7 are views illustrating examples of images captured by the camera 2*a* of the portable terminal 2 in the reading of the book document. FIG. 6 is an example of an image obtained by capturing a capturing region including the document table 11*a* on which the book document in a state where the first page including an image A and an image B is open is placed, by the camera 2*a* of the portable terminal 2. FIG. 7 is an example of an image obtained by capturing a capturing region including the document table 11*a* on which the book document in a state where the second page, including an image C and an image D is open is placed, by the camera 2*a* of the portable terminal 2.

In other words, the camera 2*a* of the portable terminal 2 captures an image of the capturing region including the entire document table 11*a* from above the document table 11*a*. The user instructs the reading on the operation panel 13 of the digital multi-functional machine 1 in a state where the book document having a desired page open is placed on the document table 11*a*. The digital multi-functional machine 1 instructs the portable terminal 2 to capture the image with the camera 2*a* in response to the instruction of the user. The portable terminal 2 captures an image of a capturing region including an image of the page of the book document with the camera 2*a* in response to the instruction from the digital multi-functional machine 1. As illustrated in FIG. 6 or 7, the image captured by the camera 2*a* includes an image of an opened page in the book document. The portable terminal 2 transfers the captured image as illustrated in FIG. 6 or 7 to the digital multi-functional machine 1.

The digital multi-functional machine 1 generates a book image file in which a cover image to be read by the scanner 11 and images of each page captured by the camera 2*a* of the portable terminal 2 are associated with each other. When the camera 2*a* of the portable terminal 2 captures a plurality of pages of the book document, the book image file is obtained by merging the cover image and the images of the plurality of pages.

Figure 8:
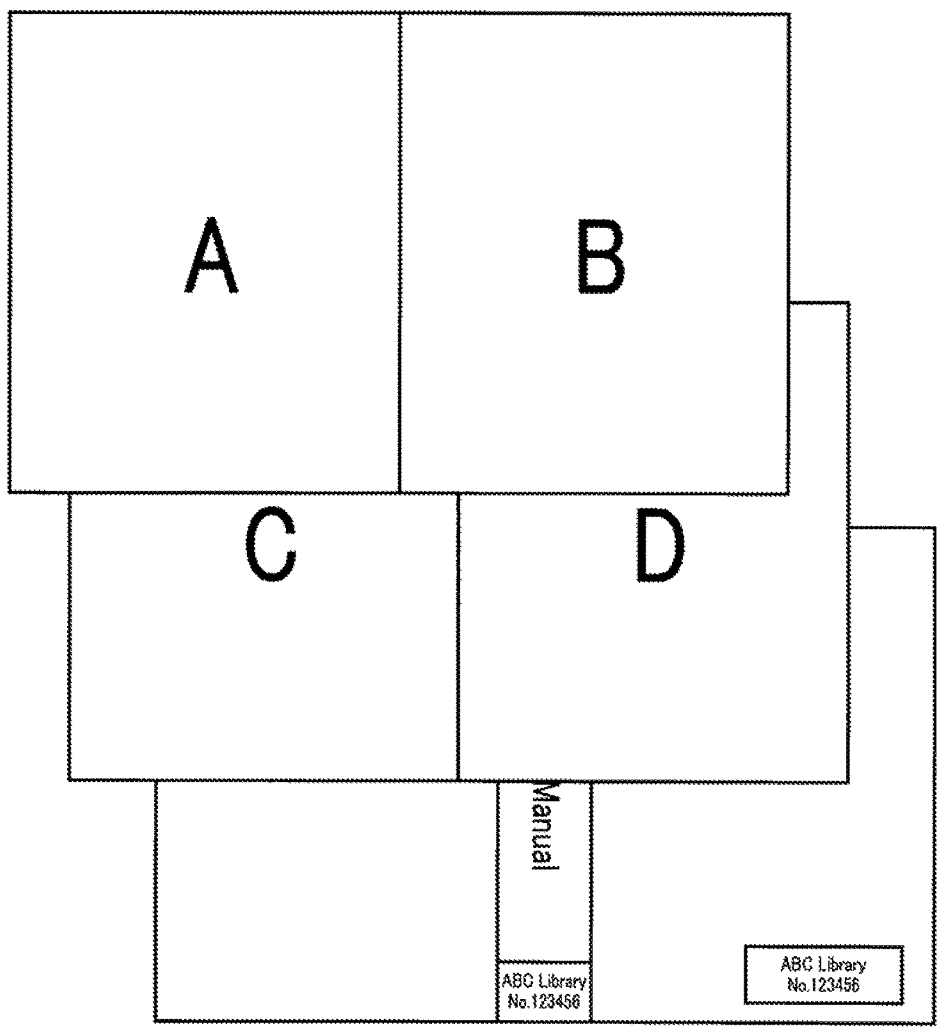
FIG. 8 is a view schematically illustrating an image file in which an image read by the scanner of the image processing apparatus according to the embodiment and another image captured by the camera of the portable terminal are associated with each other.

FIG. 8 is a view schematically illustrating a book image file in which the cover image read by the scanner 11 and the page image captured by the camera 2*a* are associated with each other. FIG. 8 is a view schematically illustrating a book image file in which the cover image included in the scanned image illustrated in FIG. 5 and the page images for two pages included in the captured images illustrated in FIGS. 6 and 7 are associated with each other.

The digital multi-functional machine 1 generates a cover image of the book document by performing image processing, such as cutting-out of the document region with respect to the scanned image illustrated in FIG. 5. In addition, the digital multi-functional machine 1 generates an image of each page by performing the image processing, such as cutting-out of the document region with respect to each of the captured images illustrated in FIGS. 6 and 7. The digital multi-functional machine 1 generates a book image file by associating the image of the cover obtained from the scanned image of the scanner 11 with the image of each page obtained from the captured image of the camera 2*a*.

In addition, the digital multi-functional machine 1 obtains book information, such as a book name or a management number of the book document, by executing the OCR processing with respect to the cover image to be read by the scanner 11. The digital multi-functional machine 1 generates a book document file in which the book information obtained by the OCR processing and the image data on the front and rear sides are associated with each other. In addition, the digital multi-functional machine 1 may give a file name including a part of the book information obtained by the OCR processing to the generated book document file.

The digital multi-functional machine 1 stores the book document file generated by associating the book information with the front and rear image data, in the HDD 25. In addition, the digital multi-functional machine 1 also has a function of transferring the book document file to the portable terminal 2 via the external I/F 17 in response to the designation of the user. Further, the digital multi-functional machine 1 may store the generated book document file in a memory device connected to the external I/F 17. In addition, the digital multi-functional machine 1 may transfer the generated book document file to a device, such as a server on a network that can communicate via the external I/F 17.

Next, the information management table 25*a* provided in the HDD 25 will be described.

FIG. 9 is a view illustrating an example of the information management table 25*a*.

The information management table 25*a* is a data structure for storing various types of information obtained in a series of reading using the scanner 11 and the camera 2*a* of the portable terminal 2. In the example illustrated in FIG. 9, the information management table 25*a* stores front surface data, rear surface data, and OCR data.

The front surface data is image data captured by the camera 2*a* of the portable terminal 2 and information related to the image data. The front surface data includes information, such as image data, a document detection position, a detection size, and the like. The front surface data is generated by the number of pages captured by the camera 2*a* of the portable terminal 2. The image data in the front surface data is image data obtained from the image captured by the camera 2*a*. The image data of the front surface data may be an image captured by the camera 2*a*, or image data obtained by performing image processing with respect to the captured image.

The document detection position of the front surface data is information indicating the position of the image detected as a document in the captured image of the camera 2*a*. For example, the document detection position is information indicating the position of the document to be cut out by the image cutting-out with respect to the captured image of the camera 2*a*. In addition, the detection size is information indicating the size of a page image detected as a document in the captured image of the camera 2*a*. For example, the detection size is information obtained by the size detection with respect to the captured image.

The rear surface data is image data to be read by the scanner 11 and information related to the image data. The rear surface data includes information, such as image data, a document detection position, a detection size, and the like of the rear surface. The rear surface data is generated by the number of images scanned by the scanner 11. However, when the rear surface is scanned one time in the book document or the like, the rear surface data is generated for the image of the cover scanned by the scanner 11.

The image data of the rear surface is obtained by scanning the cover with the scanner 11. In addition, the obtained image data may be processed by the image processing unit 16. The document detection position is decided based on the obtained image data of the cover. To obtain the document detection position data of the rear surface, in a case of a rectangular document, a vertex out of the four vertices in the image data, which is closest to a corner of the document placing table 11*a*, is used as a reference vertex. For example, the document detection position is information indicating the position of the document to be cut out by the image cutting-out with respect to the scanned image. In addition, the detection size is information indicating the size of the cover detected as a document in the scanned image. For example, the detection size is information obtained by the size detection with respect to the scanned image.

In addition, the OCR data is information obtained by the OCR processing with respect to the image data of the rear surface obtained by a series of reading. In the embodiment, the OCR data is information obtained by the OCR processing with respect to the image data read by the first scanning performed by the scanner 11. The OCR data is text information or the like included in the image read by the scanner 11. For example, the OCR data in FIG. 9 is stored as a book name, an owner name, an administrator and management number as a result of recognizing book information by the OCR processing. The OCR data may be input or corrected by the operation of the user.

The digital multi-functional machine 1 generates an image file by combining any of the front surface data, the rear surface data, and the OCR data which are stored in the information management table 25*a*. The combination of the front surface data, the rear surface data, and the OCR data may be set to generate an image file according to the type of the document. For example, with respect to the book document as illustrated in FIG. 8, the rear surface scanning is performed once and the front surface scanning is performed a plurality of times. Regarding such a document, it is considered to generate image files with combinations of the following (a), (b), or (c).

(a) image data of cover+image data of plural pages (b) image data of plural pages+OCR data (c) image data of cover+image data of plural pages+OCR data In addition, regarding the document to which double-sided scanning is performed a plurality of times, it is considered to generate the image files (d) to (g) illustrated hereinafter.

(d) image data of plural rear surfaces+image data of plural front surfaces (e) image data of plural rear surfaces+image data of plural front surfaces+deletion of image data of blank page (f) image data of plural rear surfaces+image data of plural front surfaces+OCR data (g) image data of plural rear surfaces+image data of plural front surfaces+OCR data+deletion of image data of blank page In addition, in (d) and (g), an image file in which the image data of the rear surface and the image data of the front surface are alternately arranged may be generated. It is also considered to set a part of the OCR data as the file name in the image file generated by the above-described combination. In addition, it is also considered to set a part of the OCR data as the file name in the image file generated by the above-described combination.

Here, as an example, the information management table 25*a* created in the reading of the book document from which image data illustrated in FIG. 8 is obtained will be described.

In the reading of the book document, the information management table 25*a* stores the image data of the cover as the rear surface data and the image data of each of the pages as the front surface data. In addition, in the reading of the book document, the information management table 25*a* stores information obtained by the OCR processing with respect to the image data of the front cover, as the OCR data.

In other words, when the document is a book document, information related to the front cover image read by the scanner 11 is stored as the rear surface data. In the reading of the book document, the digital multi-functional machine 1 obtains the image data of one cover by one time of scanning performed by the scanner 11. Therefore, the information management table 25*a* stores the image data of one cover, the position of the cover and the cover size, as the rear surface data.

In other words, when the document is a book document, information related to each of the page images captured by the camera 2*a* of the portable terminal 2 is stored as the front surface data. In the reading of the book document, the digital multi-functional machine 1 obtains the image data of a plurality of pages in response to the operation of the user with the camera 2*a* of the portable terminal 2. The information management table 25*a* stores the information of each of the pages by the number of pages captured by the camera 2*a* of the portable terminal 2, as the front surface data. The information related on each of the page images includes information, such as the image data, the document detection position, and detection size of the page illustrated in FIG. 9.

In addition, when the document is a book document, book information read from the cover of the book is stored as an OCR data. The book information may be obtained by the OCR processing with respect to the image data of the cover obtained by the scanner 11. In the example illustrated in FIG. 9, as an example of the book information, a book name, a library name, and the management number are illustrated.

Next, the reading of the book document using the portable terminal 2 by the digital multi-functional machine 1 will be described.

Figure 10:
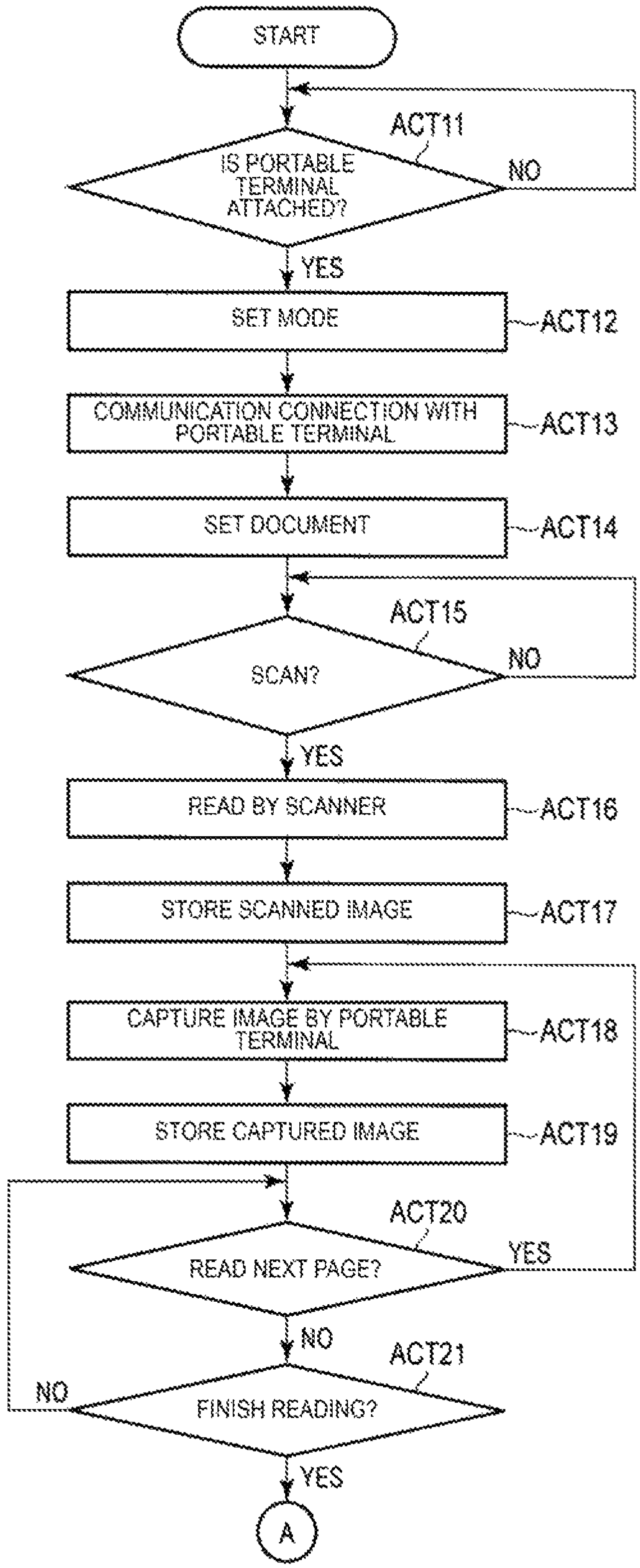
FIGS. 10-12 depict a flowchart for explaining an operation example of reading of a book document by the image processing apparatus according to the embodiment.
Figure 11:
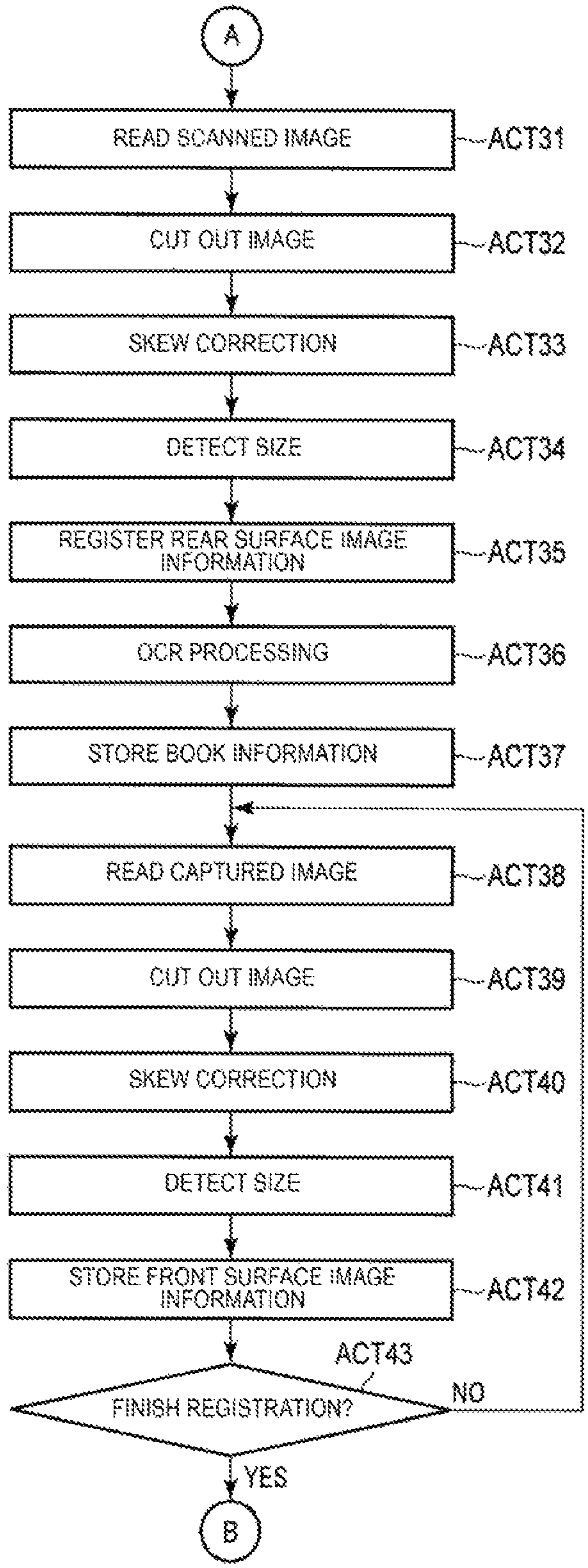
Figure 12:
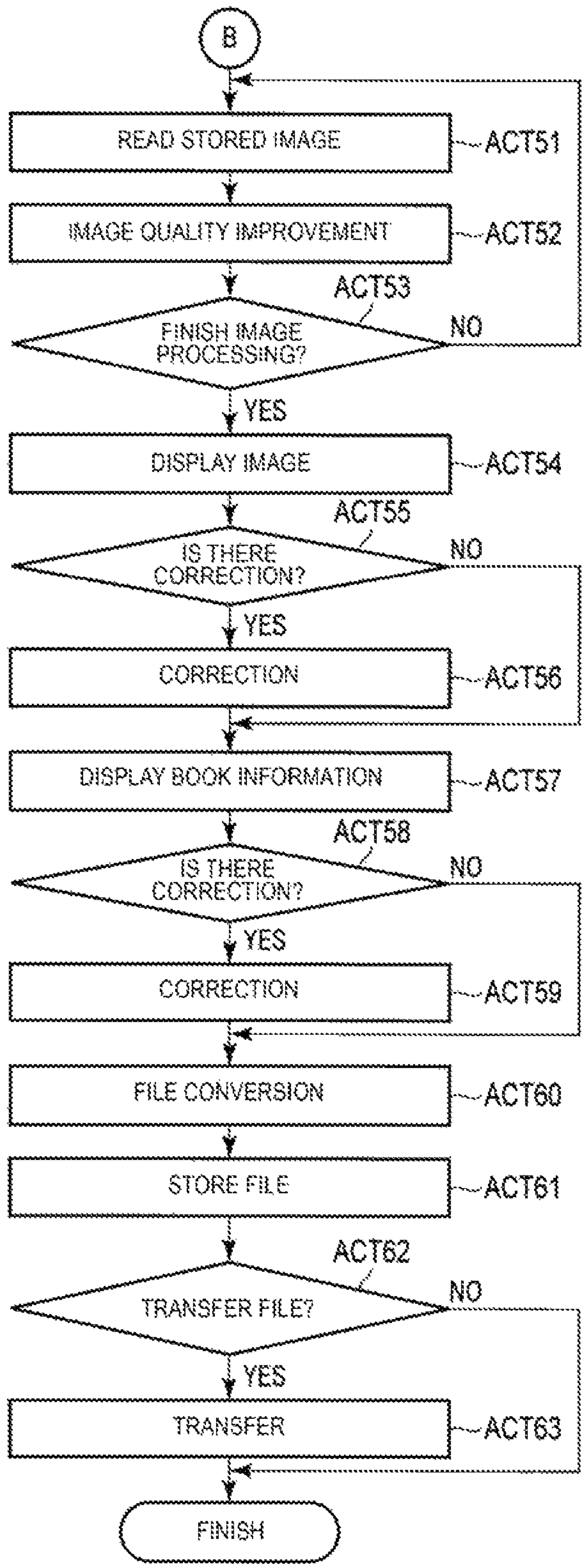

FIGS. 10 to 12 are flowcharts for explaining an operation example of the reading of the book document using the portable terminal 2 by the digital multi-functional machine 1.

First, the user sets the portable terminal 2 which activates the application for reading the book document in the holding unit 14, and designates the reading of the book document on the operation panel 13. In addition, the user designates setting information, such as resolution, a document mode, a file format, file transferor storage destination, and the like, for generating the book image file, as necessary, by the operation panel 13. The processor 21 of the digital multi-functional machine 1 performs various settings in response to the designation of the user.

When the reading of the book document is designated on the operation panel 13, the processor 21 of the digital multi-functional machine 1 detects whether or not the portable terminal 2 is set in the holding unit 14 (ACT 11). When detecting that the portable terminal 2 is set (ACT 11, YES), the processor 21 sets the operation mode to the reading mode of the book document (ACT 12). When the reading mode of the book document is set, the processor 21 is connected to the portable terminal 2 to communicate therewith (ACT 13).

When the communication connection with the portable terminal 2 is established, the processor 21 notifies that the book document is set on the document table 11*a* (ACT 14). For example, the processor 21 controls the display unit 13*a* of the operation panel 13 to display a message that the reading of the book document is possible and setting guide of the book document. When notifying the setting guide of the book document, the processor 21 waits for an input of a scan instruction by the operation unit 13*b* of the operation panel 13 (ACT 15). For example, as illustrated in FIG. 1, the user places the book document on the document table 11*a* with the page surface to be scanned of the book document facing upward, and instructs the start of scanning on the operation panel 13.

When the start of scanning is instructed (ACT 15, YES), the processor 21 executes image reading by the scanner 11 (ACT 16). By scanning a carriage, the scanner 11 reads the cover of the book document placed on the document table 11*a* from below the document table 11*a*. The scanned image including the image of the cover read by the scanner 11 is stored in the page memory 24 after being processed by the input processing unit 16*a* of the image processing unit 16. The processor 21 registers the scanned image stored in the page memory 24 as the cover image data in the information management table 25*a* (ACT 17). For example, in the example illustrated in FIG. 9, the scanned image read by the scanner 11 is registered as cover image data B1 in the information of the cover image of the information management table 25*a*.

When the scanned image read by the scanner 11 is stored, the processor 21 captures the image with the camera 2*a* by sending an instruction of capturing to the portable terminal (ACT 18). For example, the processor 21 instructs the portable terminal 2 to capture the image with the camera 2*a* by a function of remotely controlling the portable terminal 2 that can communicate via the external I/F 17. The portable terminal 2 supplies an image captured by the camera 2*a* in response to the instruction from the digital multi-functional machine 1, to the digital multi-functional machine 1. When a book document is placed on the document table 11*a* in a state where the page is open upward, the camera 2*a* captures an image including the image of the page of the book document. The portable terminal 2 supplies the captured image including the image of the page captured by the camera 2*a*, to the digital multi-functional machine 1.

In the digital multi-functional machine 1, the image captured by the camera 2*a* by the external I/F 17 is obtained from the portable terminal 2. The captured image of the camera 2*a* obtained by the external I/F 17 is stored in the page memory 24 after being processed by the input processing unit 16*a* of the image processing unit 16. The processor 21 registers the captured image stored in the page memory 24 as the front surface image data of the second page in the information management table 25*a* (ACT 19). For example, in the example of the information management table 25*a* illustrated in FIG. 9, the first captured image captured by the camera 2*a* is registered as front surface image data F1 in the information of the front surface image of the first page.

In addition, when obtaining the image captured by the camera 2*a* of the portable terminal 2, the processor 21 receives an instruction of scanning an additional page or an instruction of finishing the scanning on the operation panel 13 (ACTS 20 and 21). For example, the processor 21 controls the display unit 13*a* on the operation panel 13 to display an instruction button for scanning an additional page that can be selected by the user and an instruction button for finishing the scanning. Furthermore, when reading another page in the book document, the user turns over the page to be read in the book document placed on the document table 11*a* and instructs scanning of the additional page.

When the scanning of the additional page is instructed (ACT 20, YES), the processor 21 remotely controls the portable terminal 2, and accordingly, captures the next image with the camera 2*a* of the portable terminal 2 (ACT 18). The portable terminal 2 captures the image with the camera 2*a* in response to the instruction from the digital multi-functional machine 1. The portable terminal 2 captures the capturing region including the document table 11*a*, where the book document with the next page open is placed, with the camera 2*a*. Then, the portable terminal 2 supplies the image captured by the camera 2*a* to the digital multi-functional machine 1. The processor 21 stores the image captured by the camera 2*a* obtained by the external I/F 17 in the page memory 24. The processor 21 registers the captured image stored in the page memory 24 as the front surface image information of the second page in the information management table 25*a* (ACT 19). For example, in the example of the information management table 25*a* illustrated in FIG. 9, the second captured image captured by the camera 2*a* is registered as front surface image data F2 in the information of the front surface image of the second page.

The processor 21 repeatedly executes the processing of ACTS 18 and 19 upon the instruction of the scanning of the additional pages. Accordingly, the processor 21 can obtain the plurality of captured images of the plurality of pages in the book document with the camera 2*a* of the portable terminal 2.

When the finish of the reading of the book document is instructed (ACT 21, YES), the processor 21 performs processing for associating the cover image of the book document with the images of each of the pages to convert images into a file. In the embodiment, the processor 21 executes each of the image processing with respect to the image data of the rear surface and the image processing with respect to image data of the front surface. The processor 21 registers the information obtained by the image processing in the information management table 25*a*.

In other words, in order to execute the image processing with respect to the image data of the cover, the processor 21 reads a scanned image including a cover image (ACT 31). When the scanned image is read, the processor 21 executes the image cutting-out to cut out the image of the cover part with respect to the read scanned image (ACT 32). Here, the scanner 11 scans the reading region of the document table 11*a* on which the book document is placed in a state where the document table cover 11*b* open. Therefore, the scanned image to be read by the scanner 11 has the maximum density in the region where the book document does not exist, and the color of the non-existing region is black. In the image cutting-out, the processor 21 detects an edge of the document of the cover region in order to specify the region where the document does not exist in the scanned image. When detecting the edge of the document region, the processor 21 cuts out the region of the image data surrounded by the detected edge as the image data of the cover of the book document.

When the image cutting-out is executed, the processor 21 executes the skew correction with respect to the image data of the cut-out cover (ACT 33). The processor 21 analyzes the inclined state of the image data of the cover to which the image cutting-out is performed. When there is an inclination to be corrected, the processor 21 corrects the inclination of the image data of the cover.

When the skew correction is executed, the processor 21 executes size detection for detecting the size of the cover based on the image data of the cover after the skew correction (ACT 34). For example, the processor 21 specifies the size of the cover by temporarily storing the image data of the cover in the page memory 24 after the skew correction.

When the size of the cover is specified, the processor 21 registers the cover image information in the information management table 25*a* (ACT 35). For example, the processor 21 stores the image data of the cover to which the skew correction is performed in the cover image information of the information management table 25*a* as the image data B1. In addition, the processor 21 stores the document detection position and detection size which are obtained by the size detection in the cover image information of the information management table 25*a*.

In addition, after specifying the size of the cover, the processor 21 performs the OCR processing for recognizing the book information from the image data of the cover to which the skew correction is performed (ACT 36). For example, the processor 21 specifies the target region of the OCR processing in the image data of the cover after the skew correction based on the size of the cover. The processor 21 recognizes the letters by the OCR processing with respect to the target region in the image data of the cover. The processor 21 stores the information obtained by the OCR processing in the information management table 25*a* as the book information of the book document (ACT 37).

For example, in the image of the cover image, as illustrated in FIG. 5, a region R1 and a region R2 may be set as the target region of the OCR processing. The region R1 illustrated in FIG. 5 is assumed as a region of the back cover. The region R1 is set as a region near the center of the cover size in a sub-scanning direction (lateral direction in FIG. 5) of the cover image. In addition, the region R2 is assumed to be a region with a label pasted at a predetermined position on the cover of the book document. The region R2 is set as the region of the label near the lower right part in the image of the cover.

In the example illustrated in FIG. 5, the processor 21 recognizes the letters “Scan Operation Manual” as the book name of the book document from the region R1. In addition, the processor 21 recognizes the letters “ABC Library” as the library name that owns the book document from the region R2 and the letters “123456” as the management number of the book document. The processor 21 stores the information obtained by the OCR processing with respect to the image of the cover in the information management table 25*a* as the book information. For example, as illustrated in FIG. 9, the result of the OCR processing with respect to the region R1 and the region R2 which are illustrated in FIG. 5 is stored in the information management table 25*a*.

In addition, the processor 21 also executes the image processing with respect to the captured image including images of each of the pages captured by the camera 2*a*. When the image data of the plurality of front surfaces are stored in the page memory 24, the processor 21 sequentially reads the image data of the front surface (ACT 38). For example, the processor 21 reads the captured image of the first page. The processor 21 executes the image cutting-out for cutting out the document region from the read captured image (ACT 39). When cutting out the document region, the processor 21 executes the skew correction with respect to the region of the cut-out page image (ACT 40). When the skew correction is executed, the processor 21 executes the size detection for detecting the size of the document based on the image data of the cover after the skew correction (ACT 41).

When the size detection is finished, the processor 21 stores the page image information of the page in the information management table 25*a* (ACT 42). In the example illustrated in FIG. 9, the processor 21 stores the page image data, the document detection position and the detection size, as the page image information in the information management table 25*a*. For example, the processor 21 stores the image data of the cover of the first page to which the skew correction is performed in the page image information of the first page of the information management table 25*a* as the image data F1. In addition, the processor 21 also stores the information, such as the document detection position and the detection size, which is obtained by the size detection in the information management table 25*a*, as the image information of the first page.

Furthermore, when there is a next page (ACT 43, NO), the processor 21 reads the captured image of the next page and executes the processing of the above-described ACTS 38 to 42. For example, the processor 21 stores the image data of the second page to which the skew correction is performed in the page image information of the second page of the information management table 25*a* as the image data F2. In addition, the processor 21 also stores the information, such as the document detection position and the detection size, which is obtained by the size detection in the page image information of the second page of the information management table 25*a*.

When the image information for all the pages is stored in the information management table 25*a*, the processor 21 performs the image quality improvement of each of the images. In other words, the processor 21 sequentially reads the image data of cover and the image data of each of the pages in the information management table 25*a* (ACT 51). The processor 21 performs the image quality improvement with respect to each image data to be sequentially read by the image quality improvement unit 16*b* of the image processing unit 16 (ACT 52). The image to which the image quality improvement is performed is temporarily stored in the page memory 24.

When the image quality improvement with respect to all of the front and rear image data is finished (ACT 53, YES), the processor 21 causes to display the image data after the image processing on the display unit 13*a* (ACT 54). For example, the processor 21 controls the display unit 13*a* to display the image data of the cover and the image data of each of the pages as thumbnail images. The processor 21 controls the display unit 13*a* to display each of the images and receives correction with respect to the displayed image (ACT 55). When the correction with respect to the image is instructed (ACT 55, YES), the processor 21 performs the correction in response to the correction instruction of the user (ACT 56).

For example, when the correction with respect to the image of the page is instructed, the processor 21 may execute the capturing of the page again. In addition, when the correction of the document region in the captured image is instructed, the processor 21 executes processing, such as image cutting-out, with respect to the captured image again.

In addition, the processor 21 may receive an instruction of deleting unnecessary images as a correction instruction. When the deletion of the image is instructed, the processor 21 deletes the image designated by the user and does not store the image in the book image file. For example, when the image of the cover is unnecessary, the processor 21 does not store the image of the cover in the book image file in response to the instruction of the user.

In addition, the processor 21 controls the display unit 13*a* to display the book information recognized by the OCR processing (ACT 57). The processor 21 controls the display unit 13*a* to display the book information that serves as the recognition result and receives the instruction of the correction with respect to the displayed book information (ACT 58). When the correction with respect to the book information is instructed (ACT 58, YES), the processor 21 performs the correction in response to the correction instruction of the user (ACT 59). For example, the processor 21 receives the correction of the erroneously recognized letters in the book information that serves as the recognition result by the OCR processing. In addition, when the user instructs the target region of the OCR in the image data of the cover, the processor 21 may execute the OCR processing with respect to the designated region again.

After all of the images and the book information which are displayed on the display unit 13*a* are confirmed, the processor 21 generates a book image file based on the information stored in the information management table 25*a* (ACT 60). For example, the processor 21 merges the image data of cover and the image data of the plurality of pages and generates a book image file in a predetermined format to which the book information is given.

When generating the book image file, the processor 21 gives a file name based on the book information to the generated book image file and stores the file name in the HDD 25 (ACT 61). For example, the processor 21 may be a file name including the book name or a file name including the library name or the management number.

In addition, the processor 21 determines whether to store the book image file generated according to the setting of the user, or transfer the book image file to the external device (ACT 62). When it is determined that transfer or storage of the book image file is instructed (ACT 62, YES), the processor 21 supplies the book image file to the designated transfer destination or storage destination (ACT 63). For example, the user may instruct to transfer the book image file generated by the digital multi-functional machine 1 to the portable terminal 2. When the transfer of the book image file to the portable terminal 2 is instructed, the processor 21 transfers the generated book image file to the portable terminal 2 via the external I/F 17. Further, the user may instruct the external memory device connected to the external I/F 17 to store the book image file. In this case, the processor 21 stores the book document file in the external memory device connected to the external I/F 17.

In the above-described embodiment, it is assumed that the target to be read is the book document. However, the target may be anything that can be placed on the document table 11*a*.

For example, when the target is a three-dimensional object having a flat plane, the target can be placed such that the plane is in contact with the document table 11*a*. In this case, the scanner 11 reads an image of the plane in the three-dimensional object which is in contact with the document table 11*a*. In addition, the camera 2*a* of the portable terminal 2 set in the holding unit 14 can obtain an image of the three-dimensional object placed on the document table 11*a* in a state where the plane is at a lower part, from above. Accordingly, the digital multi-functional machine 1 can generate an image file in which an image obtained by scanning a three-dimensional object from below and an image obtained by capturing the three-dimensional object from above are associated with each other. Furthermore, when the letter information, such as identification information, is described on the plane of the three-dimensional object, the digital multi-functional machine 1 can also generate an image file to which information described on the plane is attached.

According to the embodiment as described above, the digital multi-functional machine reads the target, such as the book document, from below and above with the scanner and the camera of the portable terminal attached onto the document table. The digital multi-functional machine generates the image file in which the image obtained by reading the target from below with the scanner and the image obtained by capturing the target from above with the camera are associated with each other. Accordingly, even when the user does not perform work of replacing the target or manually performing work of merging the plurality of pieces of image data, it is possible to easily generate the image file in which the image of the lower side of the target and the upper side of the target are associated with each other.

In addition, the portable terminal attached to the digital multi-functional machine can capture the plurality of pages with the camera in response to the operation of the user, in a state where the book document is placed on the document table with the page facing upward. When the camera of the portable terminal captures the images of the plurality of pages, the digital multi-functional machine generates the image file in which the image of the display of the book document read by the scanner and the image of the plurality of pages captured by the camera are associated with each other. In this case, since the book document is placed on the document table in a state where the page is open upward, the user easily turns over the page, and it is also easy to visually confirm the page.

In addition, the digital multi-functional machine recognizes the book information, such as the book name or the management number on the cover, by performing OCR recognition in the region set in the image data of the cover of the book document. The digital multi-functional machine stores the recognized book information in a file by associating the image data of rear surface with the image data of a page. In addition, the digital multi-functional machine can also give the information related to the book information as a file name to a book image file to be generated.

Modification Example

Next, modification examples of the above-described embodiment will be described.

The modification examples which will be described hereinafter can be applied to the digital multi-functional machine 1 illustrated in FIGS. 1 to 4. Therefore, the following description will be assumed to be realized in the above-described digital multi-functional machine 1.

In the above-described embodiment, the digital multi-functional machine 1 is described assuming that the scanner 11 scans the cover of the book document one time with respect to one book document. On the other hand, in the modification example, in the digital multi-functional machine 1, the scanner 11 also repeatedly scans the document in response to an additional scan instruction. In addition, the digital multi-functional machine 1 checks whether the scanned image scanned by the scanner 11 includes an image to be registered, and registers the image determined to be registered as a rear surface image.

Figure 13:
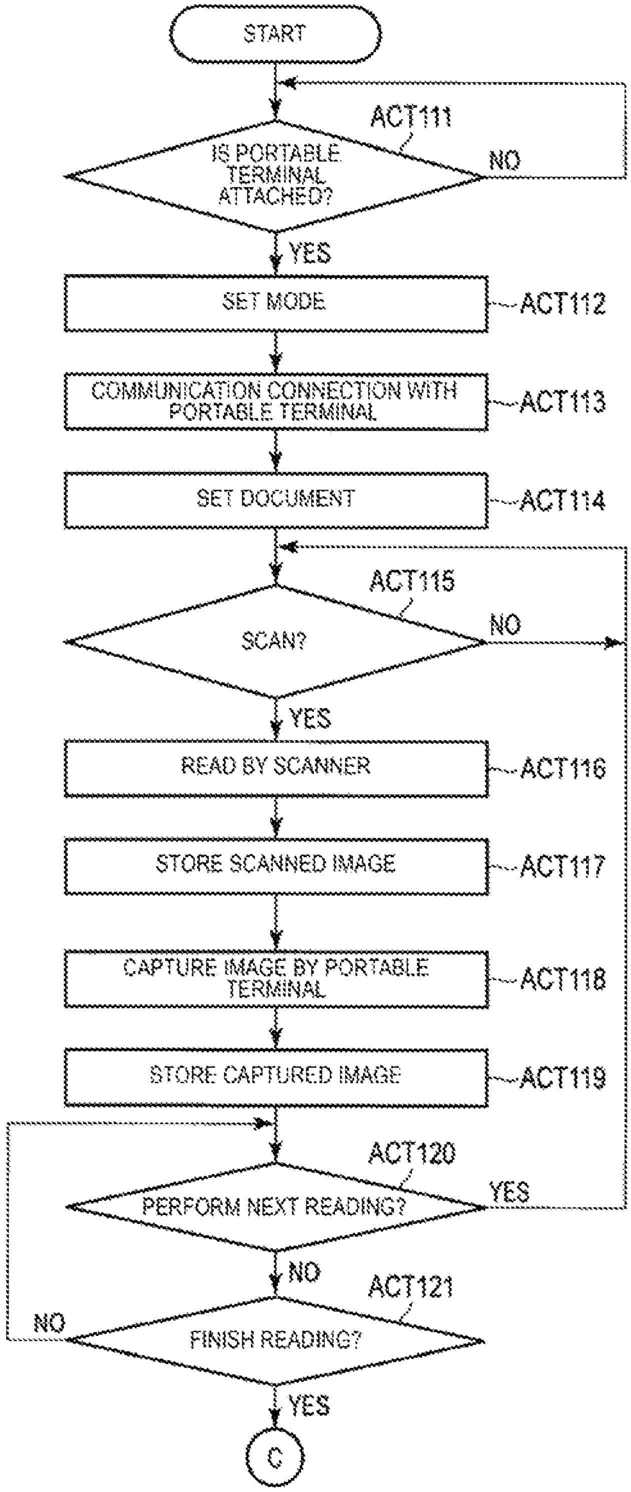
FIGS. 13-15 depict a flowchart for explaining an operation example of an image processing apparatus according to a modification of the embodiment.
Figure 14:
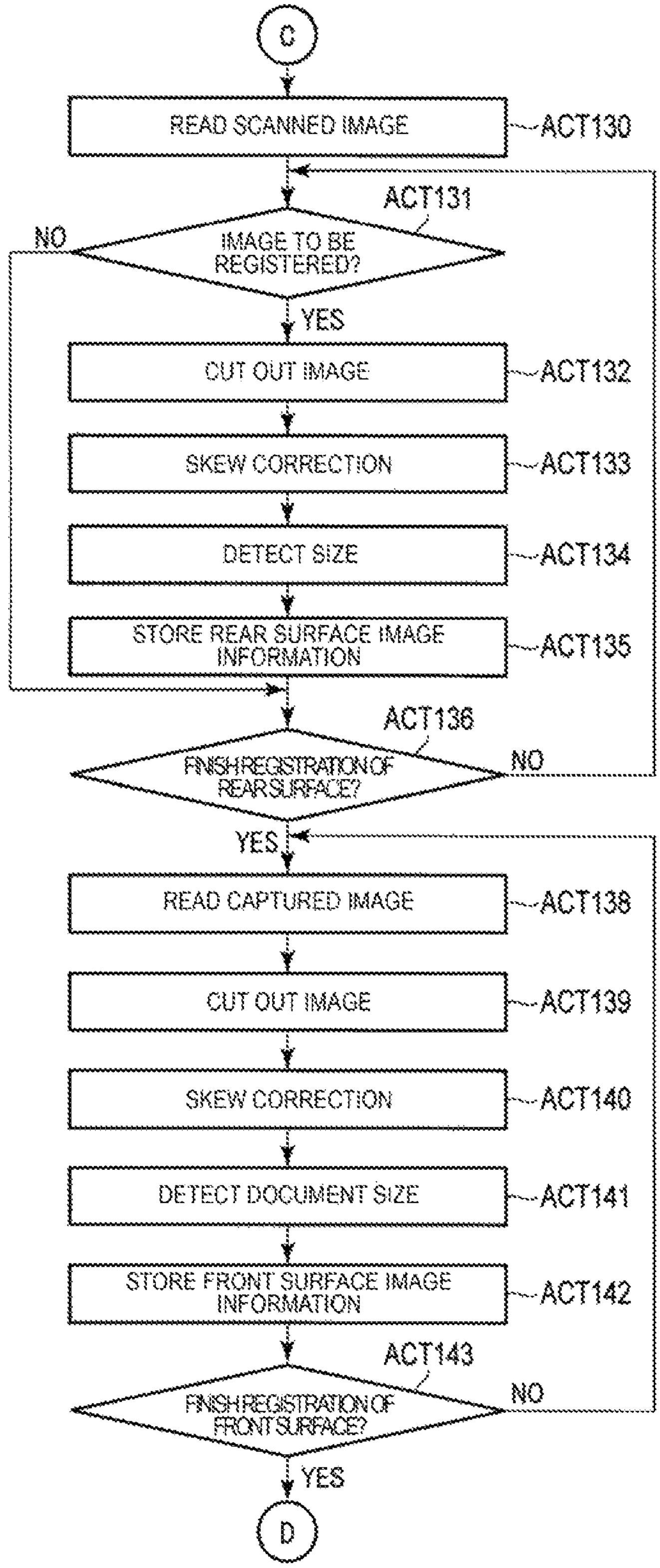
Figure 15:
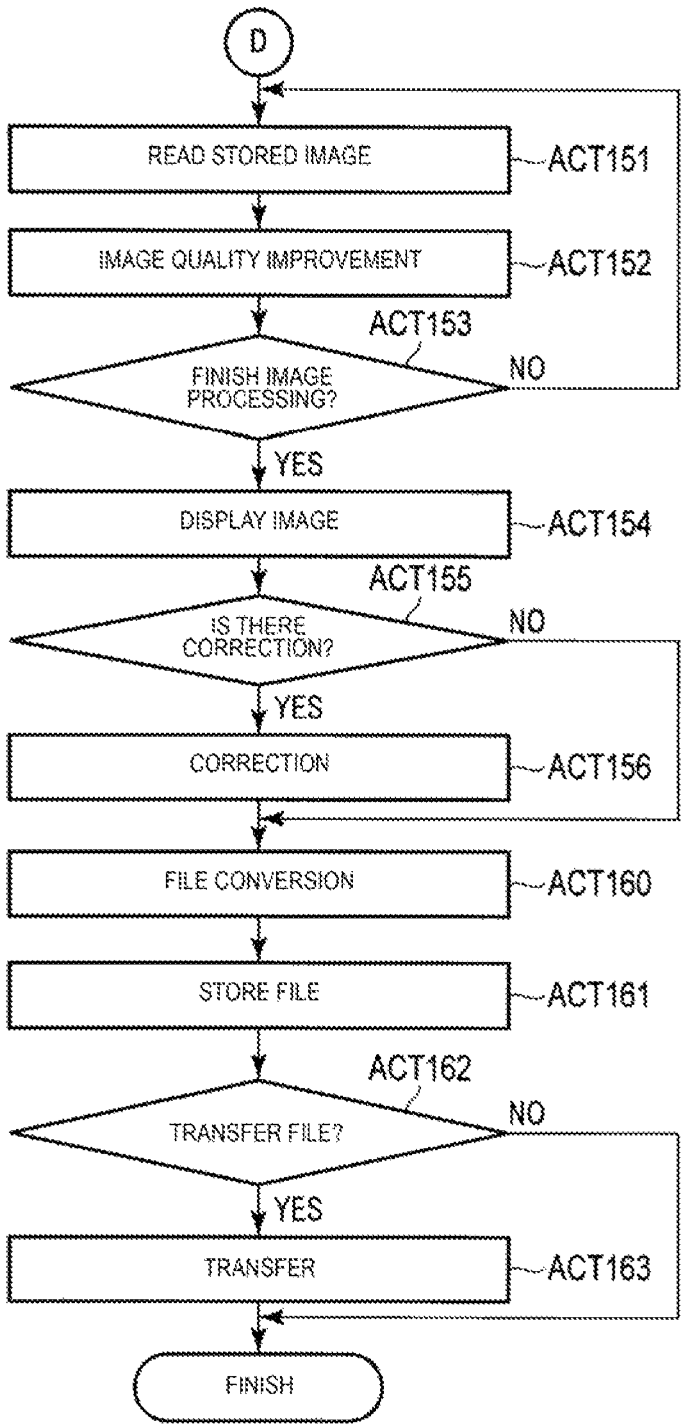

FIGS. 13 to 15 are flowcharts for explaining an operation example of the digital multi-functional machine 1 according to the modification example.

In the modification example, the user sets the portable terminal 2 which holds the application for capturing the image in cooperation with the digital multi-functional machine 1 in the holding unit 14. The user designates the setting information as required by the operation panel 13 and designates the reading mode using the portable terminal 2. When the reading mode using the portable terminal 2 is designated, the processor 21 of the digital multi-functional machine 1 detects whether or not the portable terminal 2 is set in the holding unit 14 (ACT 111). When detecting that the portable terminal 2 is set (ACT 111, YES), the processor 21 sets the operation mode to the reading mode using the portable terminal 2 (ACT 112). When the reading mode is set, the processor 21 is connected to the portable terminal 2 to communicate therewith (ACT 113).

When the communication connection with the portable terminal 2 is established, the processor 21 notifies a message that the document (target) to be read is set on the document table 11*a* (ACT 114) and waits for the input of the scan instruction (ACT 115). For example, the user presses a start button provided on the operation panel 13 as the scan instruction.

When the start of scanning is instructed (ACT 115, YES), the processor 21 executes image reading by the scanner 11 (ACT 116). By scanning the carriage, the scanner 11 reads the scanned image including the rear surface image of the document placed on the document table 11*a* from below the document table 11*a*. The processor 21 stores the scanned image processed by the input processing unit 16*a* of the image processing unit 16 in the page memory 24, and registers the scanned image as a first cover (rear surface) image data in the information management table 25*a* (ACT 117).

When the scanning by the scanner 11 is finished, the processor 21 captures the image with the camera 2*a* by sending the instruction of capturing to the portable terminal 2 (ACT 118). The portable terminal 2 supplies the image obtained by capturing an image by the camera 2*a* in response to the instruction from the digital multi-functional machine 1, to the digital multi-functional machine 1.

In addition, the image capturing by the camera 2*a* of the portable terminal 2 may be performed prior to the scanning by the scanner 11. However, the scanning by the scanner 11 and the capturing by the camera 2*a* of the portable terminal 2 are performed sequentially (alternately) in order to prevent light interference during the scanning by the scanner 11.

The digital multi-functional machine 1 obtains the captured image captured by the camera 2*a* by the external I/F 17 from the portable terminal 2. The processor 21 stores the obtained captured image by processing the image by the input processing unit 16*a* in the page memory 24, and registers the captured image as a second front surface image data in the information management table 25*a* (ACT 119).

In addition, the processor 21 receives an instruction of additional scanning or an instruction of finishing the scanning on the operation panel 13 (ACTS 120 and 121). When the additional scanning is instructed (ACT 120, YES), the processor 21 returns to ACT 116 and performs processing for obtaining the scanned image by the scanner 11 and the captured image of the camera 2*a* (ACTS 116 to 119).

When the finish of reading is instructed (ACT 121, YES), the processor 21 sequentially reads the obtained scanned image (ACT 130). When reading the scanned image, the processor 21 determines whether or not the scanned image includes an image to be registered as a rear surface image (ACT 131). For example, when the processor 21 determines that the document image included in the scanned image is a white image, the processor 21 determines that the scanned image is not registered. In addition, when it is determined that the image of the document included in the scanned image is the same image as the registered image of the rear surface, the processor 21 determines that the scanned image does not include the image to be registered. By these determinations, the processor 21 can avoid registering of blank images or overlapping images as images of the rear surface.

When it is determined that the scanned image includes an image to be registered (ACT 131, YES), the processor 21 cuts out an image of the document region from the scanned image (ACT 132). In addition, the processor 21 performs the skew correction with respect to the image data cut out from the scanned image (ACT 133), and detects the size of the document based on the image data after the skew correction (ACT 134). Further, the processor 21 registers image data of the rear surface to which the processing of ACTS 132 to 134 is performed as rear surface image information in the information management table 25*a* (ACT 135).

When the rear surface image information is registered or when it is determined that the scanned image does not include an image to be registered (ACT 131, NO), the processor 21 determines that registration of the rear surface image is finished (ACT 136). In other words, the processor 21 performs the processing of ACTS 131 to 135 with respect to all of the scanned images read by the scanner 11. When the processing of ACTS 131 to 135 with respect to all of the scanned images is finished, the processor 21 determines that registration of rear surface image information is finished (ACT 136, YES).

When the registration of the rear surface image information is finished (ACT 136, YES), the processor 21 executes the image processing with respect to each of the captured images captured by the camera 2*a*. Here, all of the captured images captured by the camera 2*a* are image-processed as the front surface image to be registered. When the plurality of captured images captured by the camera 2*a* are stored, the processor 21 sequentially reads the captured image (ACT 138). The processor 21 performs image cutting-out (ACT 139), skew correction (ACT 140), and size detection (ACT 141) with respect to the read captured image. Further, the processor 21 registers information related to the image data to which the processing of ACTS 139 to 141 are performed as the rear surface image information in the information management table 25*a* (ACT 142).

When the registration of the rear surface image information is finished (ACT 143, YES), the processor 21 sequentially reads each of the images (ACT 151) and performs image quality improvement with respect to the read image data by the image quality improvement unit 16*b* (ACT 152).

When the image quality improvement with respect to all of the image data is finished (ACT 153, YES), the processor 21 controls the display unit 13*a* to display each of the image data after the image processing (ACT 154). The processor 21 controls the display unit 13*a* to display the image data of the rear surface and the image data of the front surface, and receives the correction to the displayed image (ACT 155). When the correction with respect to the image is instructed (ACT 155, YES), the processor 21 performs the correction in response to the correction instruction of the user (ACT 156).

When the display of each of the images is finished, the processor 21 generates a book image file based on the information stored in the information management table 25*a* (ACT 160). For example, the processor 21 merges all of the image data of rear surface and the image data of the front surface and generates the book image file in a predetermined format. When generating the book image file, the processor 21 gives a predetermined file name to the generated book image file and stores the file name in the HDD 25 (ACT 161). Here, the processor 21 may give a file name including the information obtained by the OCR processing with respect to any rear surface image to the book image file. In addition, when transferring or storing the book image file to the external device (ACT 162, YES), the processor 21 supplies the book image file to the designated transfer destination or storage destination (ACT 163).

The digital multi-functional machine of the modification example described above executes not only capturing by the camera of the portable terminal but also scanning of the image by the scanner every time an additional scan instruction is received. The digital multi-functional machine determines whether or not each of the scanned images read by the scanner is an image to be registered, and registers the image determined to be registered.

Accordingly, in the digital multi-functional machine, when a document of which a rear surface is blank is placed on the document table, it is possible to avoid storing of a useless rear surface image without storing a blank rear surface image. In addition, even when the scanning is an operation of reading an image for each scan instruction, the digital multi-functional machine does not store the image when the same image is scanned, and it is possible to avoid storing the same overlapping images. In other words, in the embodiment, only data suitable for specifying the contents of the front surface data as the rear surface data and the like are selectively stored, and further, during the file conversion, the stored data or only necessary text information, such as book information or the like from the stored data is extracted, and the information is converted into files together with the front surface data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:

a document placing table;

a scanner configured to read a reading region on the document placing table from below the document placing table;

an interface configured to communicate with an image capturing device which is positioned above the document placing table to capture an image of a capturing region on the document placing table from above the document placing table; and a processor configured to:

generate an image file in which first image data obtained by reading a cover of a book placed on the document placing table with the scanner and second image data obtained from the image capturing device via the interface, are associated with each other, wherein the second image data is generated from an image of each of different pages of the book captured by the image capturing device from above the document placing table, and perform OCR processing on one or more portions of the first and second image data to generate OCR data, and add the OCR data to the image file.

2. The apparatus according to claim 1, wherein the processor is configured to detect book information from the OCR data obtained by the OCR processing performed on the first image data, and add the book information to the image file.

3. The apparatus according to claim 2, further comprising:

a display unit configured to display a recognition result of the OCR processing; and an operation unit configured to receive a correction instruction with respect to the recognition result of the OCR processing as displayed by the display unit, wherein the processor is configured to correct the recognition result of the OCR processing in response to a correction instruction input through the operation unit.

4. The apparatus according to claim 1, further comprising:

an operation unit, wherein the processor is configured to communicate an instruction through the interface to the image capturing device to capture the image of the capturing region, in response to an input made through the operation unit.

5. The apparatus according to claim 1, wherein the processor is configured to control the scanner to read the cover of the book placed on the document placing table a plurality of times and generate a plurality of scanned images, and select one of the plurality of scanned images to be included in the first image data.

6. An image processing apparatus comprising:

a document placing table;

a scanner configured to read a reading region on the document placing table from below the document placing table;

a cover for the document placing table, the cover including a holding device for an image capturing device which is positioned above the document placing table, when the cover is opened, to capture an image of a capturing region on the document placing table from above the document placing table;

an interface configured to communicate with the image capturing device; and a processor configured to:

generate an image file in which first image data obtained by reading a target placed on the document placing table with the scanner and second image data obtained from the image capturing device via the interface, are associated with each other, wherein the second image data is generated from an image of the target captured by the image capturing device from above the document placing table, and perform OCR processing on one or more portions of the first and second image data to generate OCR data, and add the OCR data to the image file.

7. The apparatus according to claim 6, wherein the cover includes a recess in which the image capturing device is accommodated and the holding device is a mechanism to hold the image capturing device in place within the recess.

8. The apparatus according to claim 6, wherein the holding device includes a pair of supports between which the image capturing device is mounted.

9. The apparatus according to claim 8, wherein the pair of supports is mounted to an edge of the cover and extends in parallel to each other from the edge of the cover.

10. The apparatus according to claim 6, further comprising:

a display unit configured to display a recognition result of the OCR processing; and an operation unit configured to receive a correction instruction with respect to the recognition result of the OCR processing as displayed by the display unit, wherein the processor is configured to correct the recognition result of the OCR processing in response to a correction instruction input through the operation unit.

11. The apparatus according to claim 6, further comprising:

an operation unit, wherein the processor is configured to communicate an instruction through the interface to the image capturing device to capture the image of the capturing region, in response to an input made through the operation unit.

12. A method of scanning contents of a book and generating an image file of the book, comprising:

opening a cover of an image processing apparatus to expose a document placing table;

placing a book on the document placing table with a cover of the book facing down on the document placing table;

scanning the cover of the book from below the document placing table to generate a first scanned image;

capturing an image of the book from above the document placing table to generate a second scanned image;

generating an image file that includes the first and second scanned images; and performing OCR processing on one or more portions of the first and second scanned images to generate OCR data, and adding the OCR data to the image file.

13. The method according to claim 12, further comprising:

turning a page of the book and capturing another image of the book from above the document placing table to generate a third scanned image; and adding the third scanned image to the image file.

14. The method according to claim 12, further comprising:

detecting book information from the OCR data obtained by the OCR processing performed on first scanned image, and adding the book information to the image file.

15. The method according to claim 12, wherein the image of the book is captured from above the document placing table by an image capturing device that is mounted to the cover of the image processing apparatus.

* * * * *